United States Patent
Tai

(10) Patent No.: US 7,720,129 B2
(45) Date of Patent: May 18, 2010

(54) FREQUENCY-HOPPING CARRIER GENERATOR

(75) Inventor: Jy-Der David Tai, Sanchong (TW)

(73) Assignee: Tai-1 Microelectronics Corp., Taipei County (TW)

(*) Notice: Subject to any disclaimer, the term of this patent is extended or adjusted under 35 U.S.C. 154(b) by 532 days.

(21) Appl. No.: 11/836,910

(22) Filed: Aug. 10, 2007

(65) Prior Publication Data
US 2008/0165830 A1    Jul. 10, 2008

(30) Foreign Application Priority Data
Jan. 6, 2007    (TW) .............................. 96119695 A

(51) Int. Cl.
*H03F 3/217*    (2006.01)
(52) U.S. Cl. .................... 375/132; 375/238; 375/297; 330/251
(58) Field of Classification Search ................. 375/132, 375/135, 238, 297; 330/251; 329/109
See application file for complete search history.

(56) References Cited
U.S. PATENT DOCUMENTS

| | | | |
|---|---|---|---|
| 6,545,533 B2* | 4/2003 | Karki et al. ................... 330/10 |
| 6,847,257 B2* | 1/2005 | Edwards et al. ............... 330/10 |
| 7,102,426 B2* | 9/2006 | Kitamura ...................... 330/10 |
| 7,317,758 B2* | 1/2008 | Alrutz et al. ................. 375/238 |
| 7,626,519 B2* | 12/2009 | Risbo .......................... 341/53 |
| 2008/0297382 A1* | 12/2008 | Risbo .......................... 341/53 |

* cited by examiner

*Primary Examiner*—Kevin Y Kim
(74) *Attorney, Agent, or Firm*—Ming Chow Sinorica, LLC

(57) ABSTRACT

The present invention discloses a frequency-hopping carrier generator, which comprises a current source, a ramp generator and a switch power amplifier. The current source generates a first current; the first current is output to the ramp generator. The output of the ramp generator is coupled to a capacitor to generate a ramp voltage. The ramp voltage is connected to a voltage detection/direction control device and a PWM module. The PWM module receives an audio input signal and generates a PWM signal. When receiving a ramp voltage, the voltage detection/direction control device outputs a control signal to the ramp generator and a counter. The counter is coupled to a digital-control current source. According to the value of the counter, the digital-control current source outputs a second current to the ramp generator. The second current is merged with the first current. The merged current is used to charge/discharge the capacitor. The input end of the switch power amplifier receives a signal from the PWM module and modulates the audio input signal to output a class-D signal.

12 Claims, 3 Drawing Sheets

FREQUENCY-HOPPING CARRIER GENERATOR

BACKGROUND OF THE INVENTION

1. Field of the Invention

The present invention relates to a frequency-hopping carrier generator, particularly to a filterless frequency-hopping carrier generator, which generates varied frequencies to reduce the EMI (Electro_Magnetic Interference) peak value according to a first current and a second current.

2. Description of the Related Art

The class-D amplifier (digital audio power amplifier) is an audio power amplifier converting an analog audio signal or a PCM (Pulse Code Modulation) signal into a PWM (Pulse Width Modulation) signal or a PDM (Pulse Density Modulation) signal and then using the PWM or PDM signal to control the switching of a high-power switch device. Therefore, the class-D amplifier is also called a switch power amplifier. The class-D amplifier has a significant advantage: high efficiency. A class-D or digital amplifier comprises an input-signal processing circuit, a switching-signal generating circuit, a switch power circuit (half-bridge or full-bridge) and a low-pass LC filter. The class-D amplifier utilizes a very-high-frequency switching circuit to process audio signals and has the following characteristics:

1. Very high efficiency, usually above 85%; and
2. Compactness (saving much more space than an analog amplifier circuit); and
3. No cracking noise.

Conventional class-D amplifiers have a disadvantage of having to use a low-pass LC filter to reduce EMI, which not only increases the cost, but the bulkiness of a low-pass filter also impairs circuit design. Therefore, advanced manufacturers proposed filterless class-D power amplifiers. In a U.S. Pat. No. 6,545,533, Texas Instruments Incorporated proposed a filterless class-D amplifier using a pseudo noise generator. However, the pseudo noise generator does not synchronize with the PWM carrier of the Class-D amplifier. Thus, the beat frequency of the two signals will interfere with audio signals. As the signal of a pseudo noise generator is a random signal, the beat frequency interference signal thereof is also a random interference signal. Therefore, the interference cannot be reduced with a specific circuit.

In a U.S. Pat. No. 6,847,257, Maxim Incorporated also proposed a filterless class-D amplifier, which has an FFM (Fixed Frequency Modulation) mode and an SSM (Spread Spectrum Modulation) mode, in which a common-mode pulse is added into the original signal. The SSM mode can reduce EMI radiation generated by frequency modulation. However the frequency of the pulse width modulating is varied, cycle to cycle, on a pseudo random basis according to U.S. Pat. No. 6,847,257 claim 11 in Column 7.

Refer to FIG. 1 for a sample spectrogram of a conventional class-D amplifier; wherein the energy peak is −4 db, and the energy level at 5th harmonics is −20 db. Thus, the present invention proposes a frequency-hopping carrier generator, wherein the frequency modulation method is distinct from those mentioned above, to reduce EMI interference when LC filter is not in use. The improvement relative to FIG. 1 with present invention will be discussed in the Detailed Description of the Invention.

SUMMARY OF THE INVENTION

The primary objective of the present invention is to provide a frequency-hopping carrier generator, which is applied to a class-D amplifier to satisfy FCC EMI requirements without using an LC filter for cost reduction.

Another objective of the present invention is to provide a frequency-hopping carrier generator, wherein the modulated frequencies are generated synchronously. When the voltage detector detects that the voltage is higher than a first voltage, the voltage detection/direction control device generates a control signal to a ramp generating circuit to change current direction so that the capacitor can change from a charge state to a discharge state. When the voltage detector detects that the voltage is lower than a second voltage, the voltage detection/direction control device generates a control signal to the ramp generating circuit to change current direction so that the capacitor can change from a discharge state to a charge state. As the charge/discharge power source is a current source, the charge/discharge characteristic curve is a straight line. Thus, the capacitor has a voltage ranging between the first voltage and the second voltage and is charged or discharged linearly to output a ramp. In addition, the slope of the ramp is changed and the slope change is synchronized with the change of charge/discharge direction.

The present invention proposes a frequency-hopping carrier generator, which comprises a current source, a ramp generator and a switch power amplifier. The current source generates a first current, and the first current is output to the ramp generator. The ramp generator is coupled to a capacitor, and the ramp generator cooperates with the capacitor to output a ramp voltage. The output ends of the ramp generator are also respectively coupled to a voltage detection/direction control device and a PWM (Pulse Width Modulation) module. The PWM module also receives an audio input signal. When the voltage detection/direction control device outputs a control signal to the ramp generator to control the charge/discharge direction of the capacitor, it also uses the same control signal to increment the counter synchronously. The output of the counter is coupled to a digital-control current source. According to the value of the counter, the digital-control current source outputs a counter-dependent second current to the ramp generator. Then, the second current and the first current are converged to change the charge/discharge slope by which the ramp generator charges/discharges the capacitor; thus, the carrier frequency is varied. In other words, the carrier frequency varies with the value of the counter. Since the control signal changes the ramp direction and, at the same instance, changes the frequency of the ramp, the frequency change is synchronized with direction change.

The frequency-hopping carrier generator of the present invention can be applied to a class-D amplifier to meet FCC EMI regulations when the LC filter is eliminated for cost purpose. Besides, the varied frequencies are generated synchronously. Therefore, the present invention can prevent from beat frequency interference.

Below, the embodiments are described in detail in cooperation with the attached drawings to make easily understood the objectives, technical contents, characteristics and accomplishments of the present invention.

DETAILED DESCRIPTION OF THE INVENTION

Figure 2:
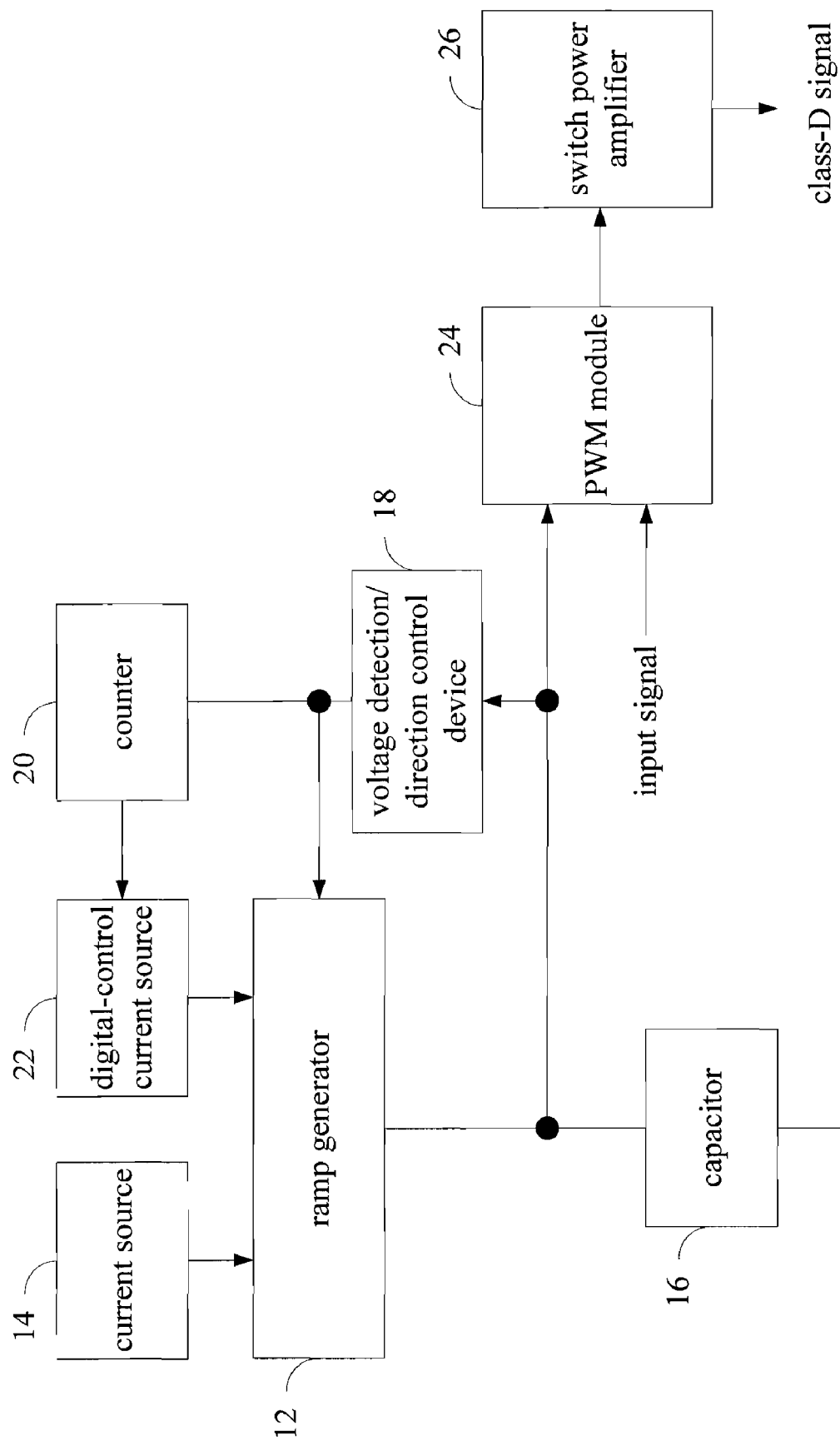
FIG. 2 is a block diagram showing the circuit architecture according to the present invention.
Figure 3:
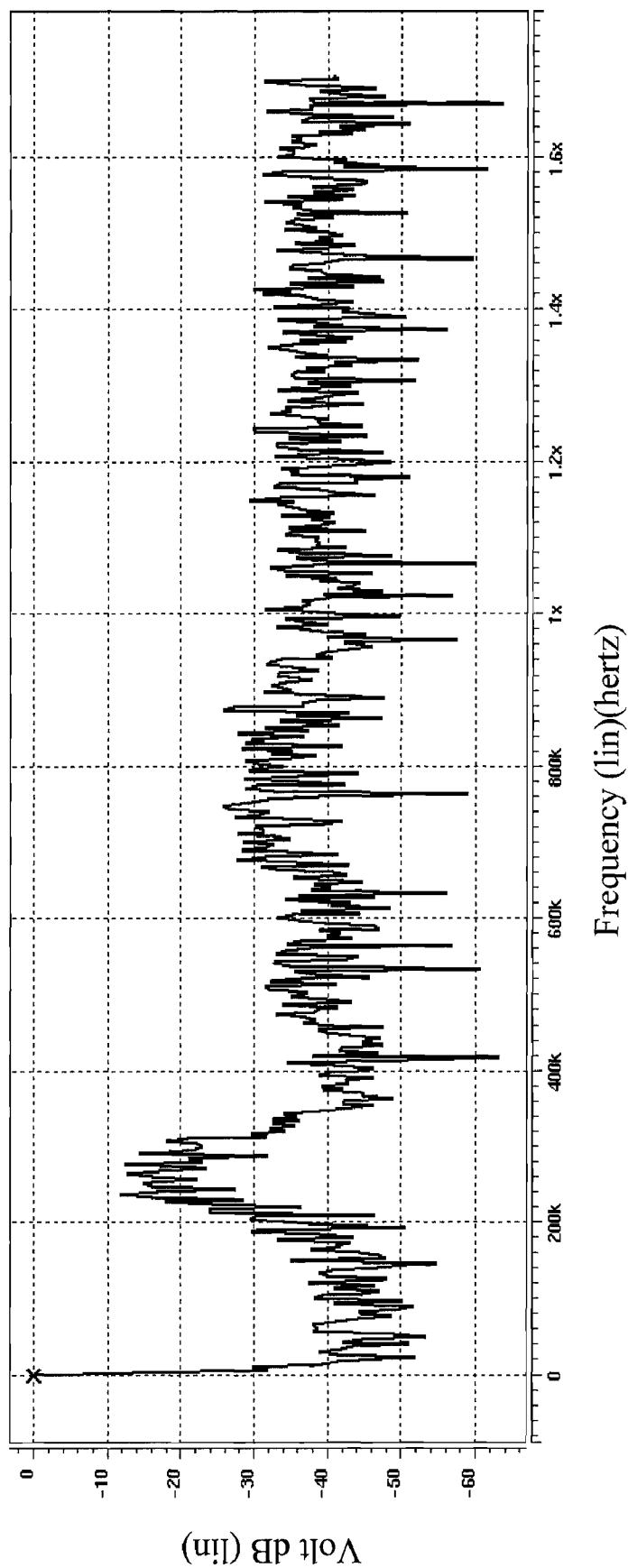
FIG. 3 is a diagram showing EMI energy level of the present invention.

Please refer to FIG. 2 and FIG. 3 for details. The frequency-hopping carrier generator of the present invention comprises a ramp generator 12, whereby varied frequencies are generated.

The frequency-hopping carrier generator of the present invention also comprises a current source 14 generating a first current. The current source 14 generates the first current and then outputs the first current to the receiving end of the ramp generator 12. After receiving the first current, the ramp generator 12 cooperates with a capacitor 16 to output a ramp voltage. As shown in FIG. 2, the output of the ramp generator 12 is coupled to the capacitor 16 (at a fixed value), a voltage detection/direction control device 18 and a PWM (Pulse Width Modulation) module 24. When the voltage detection/direction control device 18 outputs a control signal to change the charge/discharge direction of the capacitor 16, the value of a counter 20 is also updated simultaneously.

After receiving a ramp voltage, the voltage detection/direction control device 18 synchronously outputs controls signals to the ramp generator 12 and the counter 20, wherein the counter 20 is a Gray Code counter. The counter 20 is coupled to a digital-control current source 22, and the digital-control current source 22 synchronously outputs a second current to the ramp generator 12 according to the value of the counter 20. The first current and the second current are converged and function as the charge/discharge current to synchronously change the charge/discharge slope or to synchronously change the ramp frequency. So slope changes at where the direction changes. The PWM module 24 receives an audio input signal and outputs a PWM signal to the input of a switch power amplifier 26, and the switch power amplifier 26 then outputs a class-D signal.

As the Gray Code counter changes only one bit of the output code thereof each time, the transition noise thereof is lower than that of other counters. This embodiment adopts the Gray Code counter as the counter 20. An N-bit Gray Code counter 20 can generate $2^N$ values to reduce the EMI peak value according to the following equation:

$$10 \log \tfrac{1}{2}^N = -10 \log 2^N = -10 N \log 2 = -3 N db$$

Figure 1:
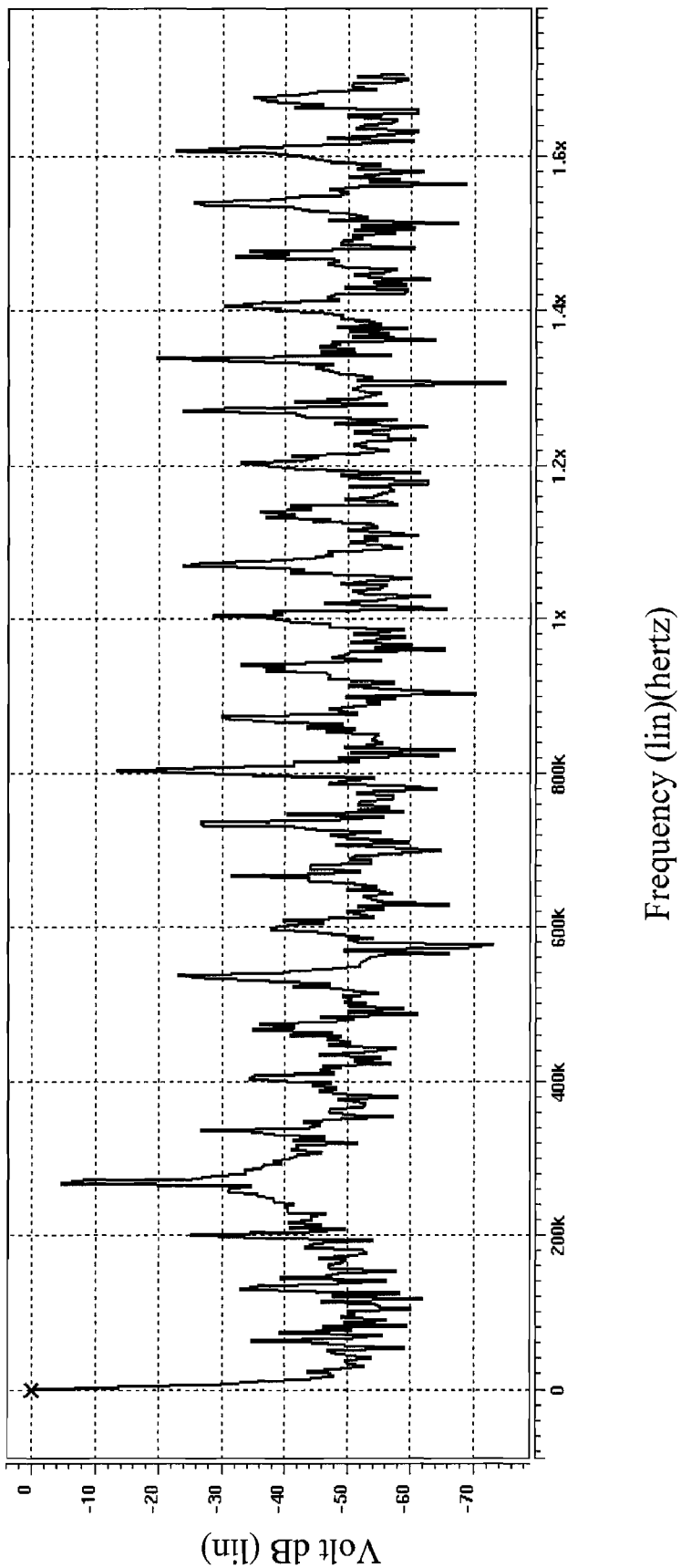
FIG. 1 is a diagram showing EMI energy level of a conventional class-D amplifier.

Therefore, if a 4-bit Gray Code counter 20 is adopted, the EMI peak value can be reduced by 12 db. Please refer to FIG. 3 in which the energy peak is −12 db, and the energy level at 5th harmonics is below −30 db. In comparison with FIG. 1, the improvement is about 8~10 db. The class-D power amplifier without a low-pass filter may adopt a deeper Gray Code counter with more output bits to further reduce EMI. No matter how many bits a Gray Code counter has, the output code changes only one bit at a time. Therefore, the transition noise of the Gray Code counter will not increase when a deeper Gray Code counter is used. Other counters, such as the binary counter, the BCD (Binary Coded Decimal) counter and the pseudo noise generator, are unlikely to change only one bit at a time and they have more bit-transition at a time when they are deeper; thus, they have higher transition noise when deeper counters are used.

In the present invention, varied frequencies are generated synchronously or the slope changes at where the direction changes. When the voltage detector detects that the ramp voltage is higher than a first voltage, the voltage detection/direction control device 18 generates a control signal to make the capacitor 16 change from a charge state to a discharge state causing ramp to change direction and go down. When the voltage detector detects that the voltage is lower than a second voltage, the voltage detection/direction control device 18 generates a control signal to make the capacitor 16 change from a discharge state to a charge state causing ramp to change direction and go up, the second current is also modified to synchronically change the charge/discharge slope.

Those described above are only the preferred embodiments to exemplify the present invention but not intended to limit the scope of the present invention. Any equivalent modification and variation according to the shapes, structures, characteristics and spirit disclosed in the present invention is to be also included within the scope of the present invention.

What is claimed is:

1. A frequency-hopping carrier generator comprising:
   a current source generating a first current;
   a ramp generator receiving said first current and outputting a ramp voltage, wherein output of said ramp generator is coupled to a capacitor, a voltage detection/direction control device and a PWM (Pulse Width Modulation) module; said PWM module receive an audio input signal; when receiving a ramp voltage, said voltage detection/direction control device synchronously outputs control signals to said ramp generator and a counter; said counter is coupled to a digital-control current source; according to a value of said counter, said digital-control current source outputs a second current to said ramp generator; and
   a switch power amplifier, wherein an input end of said switch power amplifier receives a signal from said PWM module.

2. A frequency-hopping carrier generator according to claim 1, wherein when said voltage detection/direction control device detects that a voltage from said ramp generator is higher than a first voltage, said voltage detection/direction control device generates a control signal to make said capacitor change from a charge state to a discharge state.

3. A frequency-hopping carrier generator according to claim 1, wherein when said voltage detection/direction control device detects that a voltage from said ramp generator is lower than a second voltage, said voltage detection/direction control device generates a control signal to make said capacitor change from a discharge state to a charge state.

4. A frequency-hopping carrier generator according to claim 1, wherein when said voltage detection/direction control device generates a control signal to change a charge/discharge state of said capacitor, a value of said counter is also simultaneously updated.

5. A frequency-hopping carrier generator according to claim 1, wherein said counter is a Gray Code counter.

6. A frequency-hopping carrier generator according to claim 1, wherein the current of said second current is modified according to the content of said counter.

7. A frequency-hopping carrier generator according to claim 1, wherein when a charge/discharge state of said capacitor changes, said second current is also synchronously modified.

8. A frequency-hopping carrier generator according to claim 7, wherein said first current and said modified second current are combined to generate a charge/discharge current.

9. A frequency-hopping carrier generator according to claim 8, wherein when a charge/discharge state of said capacitor changes, said charge/discharge current, which is formed via combining said first current and said second current, is also synchronously modified.

10. A frequency-hopping carrier generator according to claim 9, wherein said ramp generator cooperates with said capacitor coupled thereto to generate a ramp voltage according to said charge/discharge current.

11. A frequency-hopping carrier generator according to claim 1, wherein said PWM module modulates said audio input signal and said ramp voltage.

12. A frequency-hopping carrier generator according to claim 1, wherein said switch power amplifier receives a signal from said PWM module and modulates said audio input signal to output a class-D signal.

* * * * *